(12) United States Patent
Tseng et al.

(10) Patent No.: US 10,219,191 B2
(45) Date of Patent: Feb. 26, 2019

(54) METHOD AND DEVICE OF SENDING MEASUREMENT REPORT

(71) Applicant: MEDIATEK INC., Hsinchu (TW)

(72) Inventors: Li-Chuang Tseng, Hsinchu (TW); Chia-Chun Hsu, New Taipei (TW); Per Johan Mikael Johansson, Kungsangen (SE)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/656,366

(22) Filed: Jul. 21, 2017

(65) Prior Publication Data

US 2018/0049081 A1    Feb. 15, 2018

Related U.S. Application Data

(60) Provisional application No. 62/374,045, filed on Aug. 12, 2016.

(51) Int. Cl.
*H04W 36/00* (2009.01)

(52) U.S. Cl.
CPC ... *H04W 36/0088* (2013.01); *H04W 36/0058* (2018.08); *H04W 36/0094* (2013.01)

(58) Field of Classification Search
None
See application file for complete search history.

(56) References Cited

U.S. PATENT DOCUMENTS

| 9,560,560 B2 | 1/2017 | Yiu et al. | |
| 2008/0069058 A1* | 3/2008 | Geng | H04B 7/022 370/336 |

(Continued)

FOREIGN PATENT DOCUMENTS

| CN | 101534518 A | 9/2009 |
| CN | 102056211 A | 5/2011 |

(Continued)

OTHER PUBLICATIONS

Combined Korean Office Action and Search Report dated Feb. 6, 2018 in Patent Application No. 106126373 (with English language translation of categories of cited documents).

(Continued)

*Primary Examiner* — Ajit Patel
(74) *Attorney, Agent, or Firm* — Oblon, McClelland, Maier & Neustadt, L.L.P.

(57) ABSTRACT

Aspects of the disclosure provide a method that includes receiving a measurement configuration message indicating a predetermined number. A measurement event is defined based on the predetermined number of signal beams from a serving base station and the predetermined number of signal beams from a neighboring base station. The method also includes identifying a first number of best signal beams from the serving base station and a second number of best signal beams from the neighboring base station, where the first number and the second number are equal to or less than the predetermined number. The method further includes determining whether the measurement event occurs based on the first number of best signal beams from the serving base station and the second number of best signal beams from the neighboring base station, and sending a measurement report when the measurement event occurs.

15 Claims, 5 Drawing Sheets

(56) References Cited

U.S. PATENT DOCUMENTS

| | | | |
|---|---|---|---|
| 2009/0098874 A1* | 4/2009 | Goransson | H04W 36/0083 |
| | | | 455/438 |
| 2010/0075705 A1 | 3/2010 | van Rensburg et al. | |
| 2013/0044668 A1 | 2/2013 | Purnadi et al. | |
| 2013/0267221 A1 | 10/2013 | Srinivasan et al. | |
| 2014/0301224 A1 | 10/2014 | Lin | |
| 2015/0304868 A1 | 10/2015 | Yu et al. | |
| 2015/0312818 A1 | 10/2015 | Yiu et al. | |
| 2016/0345183 A1* | 11/2016 | Hamalainen | H04W 16/28 |
| 2016/0360463 A1* | 12/2016 | Kim | H04B 7/0617 |
| 2018/0049081 A1 | 2/2018 | Tseng et al. | |

FOREIGN PATENT DOCUMENTS

| | | |
|---|---|---|
| JP | 2016-507177 A | 3/2016 |
| KR | 10-2016-0015821 | 2/2016 |
| TW | 201127135 A1 | 8/2011 |

OTHER PUBLICATIONS

International Search Report and Written Opinion dated May 30, 2018 in PCT/CN2018/079950, 10 pages.
International Search Report and Written Opinion issued Nov. 15, 2017 in PCT/CN2017/095362, 11 pages.

\* cited by examiner

US 10,219,191 B2

METHOD AND DEVICE OF SENDING MEASUREMENT REPORT

INCORPORATION BY REFERENCE

This present disclosure claims the benefit of U.S. Provisional Application No. 62/374,045, "Mobility Procedure in mmWave systems" filed on Aug. 12, 2046, which is incorporated herein by reference in its entirety.

TECHNICAL FIELD

The disclosed embodiments relate generally to wireless communication systems, and, more particularly, to a method and a device of sending a measurement report in a wireless communication system.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a communication system, a base station may have a set of antenna elements that is configured to have a highly directional main lobe along a predetermined direction and a predetermined main lobe width during a particular period of time. The base station may transmit directional radio frequency signals, or also referred to as a directional signal beam, using the main lobe of the set of antenna elements along the predetermined direction. Also, the base station may receive signals from a mobile terminal with an elevated antenna gain when using the main lobe along such a predetermined direction. In some applications, the base station may have multiple sets of antenna elements for transmitting multiple signal beams along respective predetermined directions, or may have one set of antenna elements for transmitting multiple signal beams, either simultaneously or in a time-division manner. A mobile terminal in the communication system may communicate with the base station by using one of the signal beams from the base station. The mobile terminal may choose or be instructed to stop using a current signal beam from a serving base station and switch to using another signal beam from the same base station or from a neighboring base station when the another signal beam has a better signal quality than the current signal beam.

SUMMARY

Aspects of the disclosure provide a method that includes receiving, by a mobile terminal, a measurement configuration message indicating a predetermined number. A measurement event is defined based on the predetermined number of signal beams from a serving base station and the predetermined number of signal beams from a neighboring base station. The method also includes measuring signal beams from the serving base station and the neighboring base station, identifying, among the measured signal beams, a first number of best signal beams from the serving base station, and identifying, among the measured signal beams, a second number of best signal beams from the neighboring base station, where the first number and the second number are equal to or less than the predetermined number. The method further includes determining whether the measurement event occurs based on the first number of best signal beams from the serving base station and the second number of best signal beams from the neighboring base station, and sending a measurement report to the serving base station in response to a determination that the measurement event occurs.

Aspects of the disclosure further provide a mobile terminal that includes a transceiver and processing circuitry. The transceiver is configured to receive a measurement configuration message indicating a predetermined number, measure signal beams from the serving base station and the neighboring base station, and send a measurement report to the serving base station in response to a determination that the measurement event occurs. A measurement event can be defined based on the predetermined number of signal beams from a serving base station and the predetermined number of signal beams from a neighboring base station. The processing circuitry is configured to identify, among the measured signal beams, a first number of best signal beams from the serving base station, the first number being equal to or less than the predetermined number, identify, among the measured signal beams, a second number of best signal beams from the neighboring base station, the second number being equal to or less than the predetermined number, and determine whether the measurement event occurs based on the first number of best signal beams from the serving base station and the second number of best signal beams from the neighboring base station.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

In accordance with the present disclosure, a mobile terminal may determine whether a measurement event occurs by considering more than one signal beam from a serving base station and more than one signal beam from a neighboring base station. In response to a determination that a measurement even occurs, the mobile terminal can send a measurement report to the serving base station or may trigger a cell reselection operation. In some examples, determining occurrence of a measurement event as described in the present disclosure may decrease the likelihood of unnecessary cell-level, back-and-forth handover operations, or also known as Ping-Pong events.

Figure 1:
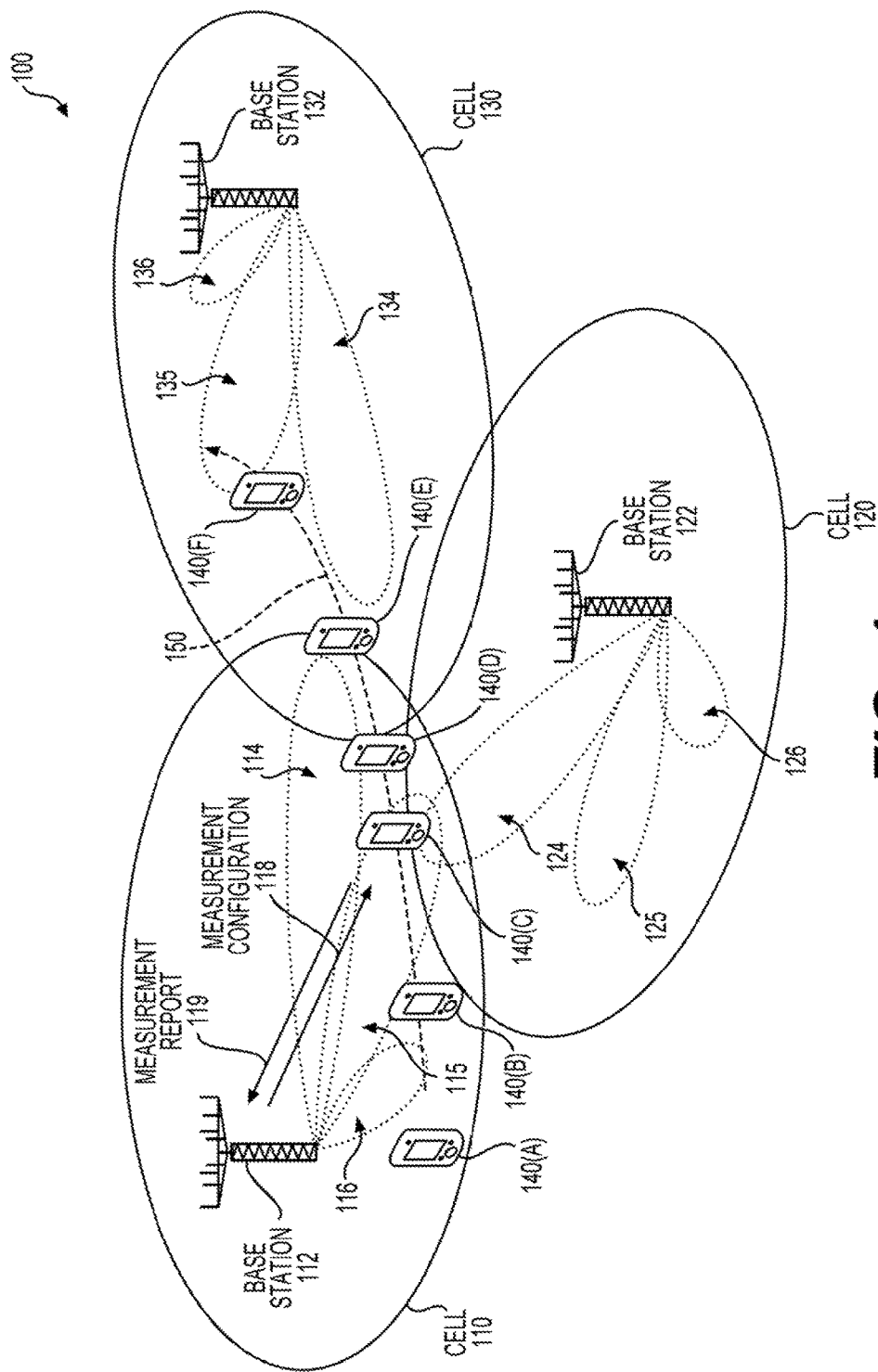
FIG. 1 shows a diagram of an exemplary communication system according to an embodiment of the disclosure.

FIG. 1 shows a diagram of an exemplary communication system 100 according to an embodiment of the disclosure. The communication system 100 includes three communication cells 110, 120, and 130 and a mobile terminal 140 moving along a path 150 from position 140(A) to position 140(F). The communication cells 110, 120, and 130 are defined by base stations 112, 122, and 132, respectively. The base station 112 can transmit multiple signal beams 114, 115, and 116; the base station 122 can transmit multiple signal beams 124, 125, and 126; and the base station 132 can transmit multiple signal beams 134, 135, and 136.

In FIG. 1, one three communication cells, three base stations, and one mobile terminal are depicted as an example. In some examples, the communication system 100 may include different number of communication cells, base stations, and mobile terminals.

The base station 112 is currently serving the mobile terminal 140 and may send a measurement configuration message 118 to the mobile terminal 140. The measurement configuration message 118 may indicate a predetermined number, where a measurement event can be defined based on at most the predetermined number (e.g., a predetermined positive integer N) of signal beams from a serving base station (e.g., base station 112) and at most the predetermined number of signal beams from a neighboring base station (e.g., base station 122). In some examples, the measurement configuration message 118 may be a Radio Resource Control (RRC) Layer measurement configuration message.

The mobile terminal 140 receives the measurement configuration message 118 and measures signal beams from the serving base station 112 and the neighboring base station 122. The mobile terminal 140 may identify at most the predetermined number of best signal beams from the serving base station 112 and at most the predetermined number of best signal beams from the neighboring base station 122. The mobile terminal may determine whether the measurement event occurs based on the identified best signal beams from the serving base station 112 and the identified best signal beams from the neighboring base station 122. In response to the occurrence of the measurement event, the mobile terminal may send a measurement report 119 to the serving base station 112. The measurement report 119 may be an RRC Layer measurement report. In some examples, instead of sending the measurement report 119, the mobile terminal 140 may initial a cell reselection operation in response to the occurrence of the measurement event.

In operation, for example, when the mobile terminal 140 is at position 140(C), the mobile terminal 140 may be currently served by the base station 112 using the signal beam 115 from the base station 112. At position 140(C), the mobile terminal 140 may also receive the signal beam 114 from the serving base station 112 and the signal beam 124 from the neighboring base station 122. The mobile terminal 140 may determine whether to transmit a measurement report 119 to the base station 112 when a predetermined triggering condition is met. Such the predetermined triggering condition is also referred to as a measurement event, and the condition is also referred to as the occurrence of the measurement event. The base station 112, based on the measurement report 119 from the mobile terminal 140, may determine whether to continue using the signal beam 115 to communicate with the mobile terminal 140, perform an intra-cell beam switching to use the signal beam 114 instead, or perform a handover to the beam 124 from the base station 122. In some examples, the decision is to be made in order to minimize the unnecessary cell-level, back-and-forth handover operations switching between the serving base station 112 and the neighboring base station 122.

In at least one example, the base station 112 may set the predetermined number to two (2). At position 140(C), the mobile terminal 140 may measure the signal beams 114, 115, and 116 from base station 112 and the signal beams 124, 125, and 126 from the base station 122. The mobile terminal 140 may identify a first number of best signal beams from the serving base station, where the first number is equal to or less than the predetermined number (e.g., two). For example, the mobile terminal 140 may identify signal beams 115 and 114 as the two best signal beams from base station 112. The mobile terminal 140 may also identify a second number of best signal beams from the neighboring base station, where the second number is equal to or less than the predetermined number (e.g., two). For example, the mobile terminal 140 may identify signal beams 124 and 125 as the two best signal beams from base station 122.

A signal beam may be considered to be better than another signal beam from the same base station when the signal beam has greater signal strength, greater signal-to-noise ratio, lower bit error rate, or a greater signal measurement determined based on one or more of the above-noted factors. In some examples, a measurement even may be defined such that only the signal beams that pass a predetermined minimum threshold would be considered. In such scenario, each of the identified first number of best signal beams from the serving base station and the identified second number of best signal beams from the neighboring base station may be required to have a signal measurement greater than the predetermined threshold.

Moreover, in some examples, if the number of signal beams from the serving base station or the neighboring base station that have signal measurement greater than the predetermined threshold is less than the predetermined number, a new upper threshold number (e.g., a positive integer N') of beams may be used to replace the predetermined number provided by the measurement configuration message for determining whether the measurement event occurs. For example, the mobile terminal 140 may identify that there are a third number of signal beams from the serving base station and a fourth number of signal beams from the neighboring base station that have signal measurements greater than the predetermined threshold. The new upper threshold number of beams for measurement event determination may be set to be equal to or less than a smallest one of the predetermined number, the third number, and the fourth number.

The mobile terminal 140 can determine whether the measurement event occurs as defined based on at most the predetermined number of best signal beams from a serving base station and at most the predetermined number of best signal beams from a neighboring base station. The mobile terminal 140 can further send the measurement report 119 to the serving base station 112 in response to the occurrence of the measurement event.

In some examples, the mobile terminal 140 can determine a first average signal measurement of the identified first number of best signal beams from the serving base station and determine a second average signal measurement of the identified second number of best signal beams from the neighboring base station. The mobile terminal 140 can determine that the measurement event occurs when the second average signal measurement is greater than the first average signal measurement by a predetermined offset. Moreover, the predetermined offset may be set to a first value when the first number is not greater than the second number, and may be set to a second value greater than the first value when the first number is greater than the second number.

The mobile terminal 140 can determine occurrence of the measurement event based on other criteria concerning whether the signal beams from the neighboring base station is better than the signal beams from the serving base station by one or more predetermined offsets. In one example, the mobile terminal 140 can first determine a first largest signal measurement of the identified first number of best signal beams from the serving base station 112, determine a second largest signal measurement of the identified second number of best signal beams from the neighboring base station 120, and then determine that the measurement event occurs when the second largest signal measurement is greater than the first largest signal measurement by the predetermined offset. In another example, the mobile terminal 140 can first compare, for each of the identified second number of best signal beams, a signal measurement thereof against that of a comparably-ranked one of the identified first number of best signal beams from the serving base station, and then determine that the measurement event occurs when all the signal measurements of the identified second number of best signal beams of the neighboring base station are greater than the respective signal measurements of the identified first number of best signal beams of the serving base station by respective predetermined offsets.

The mobile terminal 140 can also determine occurrence of the measurement event based on other criteria concerning predetermined thresholds. For example, several other measurement events can be defined as illustrated with reference to Table I.

TABLE 1

Measurement events based on absolute thresholds

| Event | Reason | Measurement Event Conditions |
|---|---|---|
| A1 | Serving cell becomes better than a threshold | Beam 1 (i.e., best signal beam) of serving cell becomes better than a threshold; Beam 1 to N (i.e., best N signal beams) of serving cell becomes better than respective thresholds; or Average of Beam 1 to N of serving cell becomes better than threshold. |
| A2 | Serving cell becomes worse than threshold | Beams 1 of serving cell becomes worse than threshold; Beams 1 to N of serving cell becomes worse than respective thresholds; or Average of Beam 1 to N of serving cell becomes worse than threshold. |
| A4 | Neighbor cell becomes better than threshold | Beams 1 of neighbor cell becomes better than threshold; Beams 1 to N of neighbor cell becomes better than respective thresholds; or Average of Beams 1 to N of neighbor cell becomes better than thresholds. |
| A5 | Serving cell becomes worse than threshold1 and neighbor becomes better than threshold2 | Beams 1 of serving cell becomes worse than threshold1 and Beams 1 of neighbor cell becomes better than threshold2; Beams 1 to N of serving cell becomes worse than respective threshold1's and Beams 1 to N of neighbor cell becomes better than respective threshold2's; or Average of Beams 1 to N of serving cell becomes worse than threshold1 and average of Beams 1 to N of neighbor cell becomes better than threshold2. |

According to Table I, in one example, the mobile terminal 140 can determine that the measurement event occurs when all signal measurements of the identified first number of best signal beams of the serving base station are less than respective predetermined first thresholds and all signal measurements of the identified second number of best signal beams of the neighboring base station are greater than respective predetermined second thresholds (Second Condition of Event A5). In another example, the mobile terminal 140 can determine that the measurement event occurs when an average signal measurement of the identified first number of best signal beams of the serving base station is less than a predetermined third threshold and an average signal measurement of the identified second number of best signal beams of the neighboring base station is greater than a predetermined fourth threshold (Third Condition of Event A5).

Moreover, the mobile terminal 140 can determine occurrence of the measurement event based solely on the identified first number of best signal beams of the serving base station 112. For example, the mobile terminal 140 can determine that the measurement event occurs when all signal measurements of the identified first number of best signal beams of the serving base station are less than respective predetermined thresholds (Second Condition of Event A2). In one example, the mobile terminal 140 can determine that the measurement event occurs when an average signal measurement of the identified first number of best signal beams of the serving base station is less than a predetermined threshold (Third Condition of Event A2).

In addition, the mobile terminal 140 can alternatively determine occurrence of the measurement event based solely on the identified second number of best signal beams of the neighboring base station 122. For example, the mobile terminal 140 can determine that the measurement event occurs when all signal measurements of the identified second number of best signal beams of the neighboring base station are greater than respective predetermined thresholds (Second Condition of Event A4). In one example, the mobile terminal 140 can determine that the measurement event occurs when an average signal measurement of the identified second number of best signal beams of the neighboring base station is greater than a predetermined threshold (Third Condition of Event A4).

In some examples, the serving base station 112 can instruct the mobile terminal 140 with respect to which one or a combination of measurement event conditions is applicable. In some examples, the mobile terminal 140 may determine which one or a combination of measurement event conditions is applicable according to a predetermined communication standard.

Also, when the mobile terminal 140 is at position 140(E), the mobile terminal 140 may be served base station 112 using the signal beam 114 from the base station 112. At position 140(E), the mobile terminal 140 may also receive the signal beam 115 from the current base station 112, the signal beam 124 from the base station 122, and the signal beam 134 from the base station 132. The mobile terminal 140 may determine whether to transmit a measurement report to the base station 112 based on at most the predetermined number of signal beams from the serving base station 112, at most the predetermined number of signal beams from a neighboring base station 122, and at most the predetermined number of signal beams from another neighboring base station.

In addition, the mobile terminal 140 may determine whether a measurement event occurs along the path 150 and may determine that a corresponding measurement event occurs at position 140(A), 140(B), 140(D), and/or 140 (F) when the signal beams from the serving base station or signal beams from a neighboring base station meet one of the conditions set forth above or based on any other suitable conditions.

The base station 112, based on the measurement report from the mobile terminal 140, may determine whether to stay with the signal beam 115, perform a handover to a signal beam from the base station 122 (e.g., the signal beam 124), or perform an intra-cell beam switching to use another signal beam (e.g., signal beam 114). When the base station 112 determines to perform a handover to a signal beam from the neighboring base station 122, the bases station 112 may further communicate with the base station 122 via a backhaul communication network that connects the base stations 112, 122, and/or 132 to prepare the base station 122 for the handover. The base station 112 then may send a handover command to the mobile terminal 140. The handover command may indicate a base station identifier for identifying the newly selected neighboring base station, such as the base station 122. The handover command may further indicate the newly selected signal beam, such as the signal beam 124.

When the base station 112 determines to switch to another signal beam of the base station 112, the bases station may prepare itself to transmit signals to the user terminal 140 via a newly selected signal beam and/or to receive signals from the user terminal 140 via an antenna main lobe corresponding to the newly selected signal beam. The base station 112 may inform the mobile terminal 140 a signal beam identifier for identifying a newly selected signal beam, such as the signal beam 115.

Figure 2:
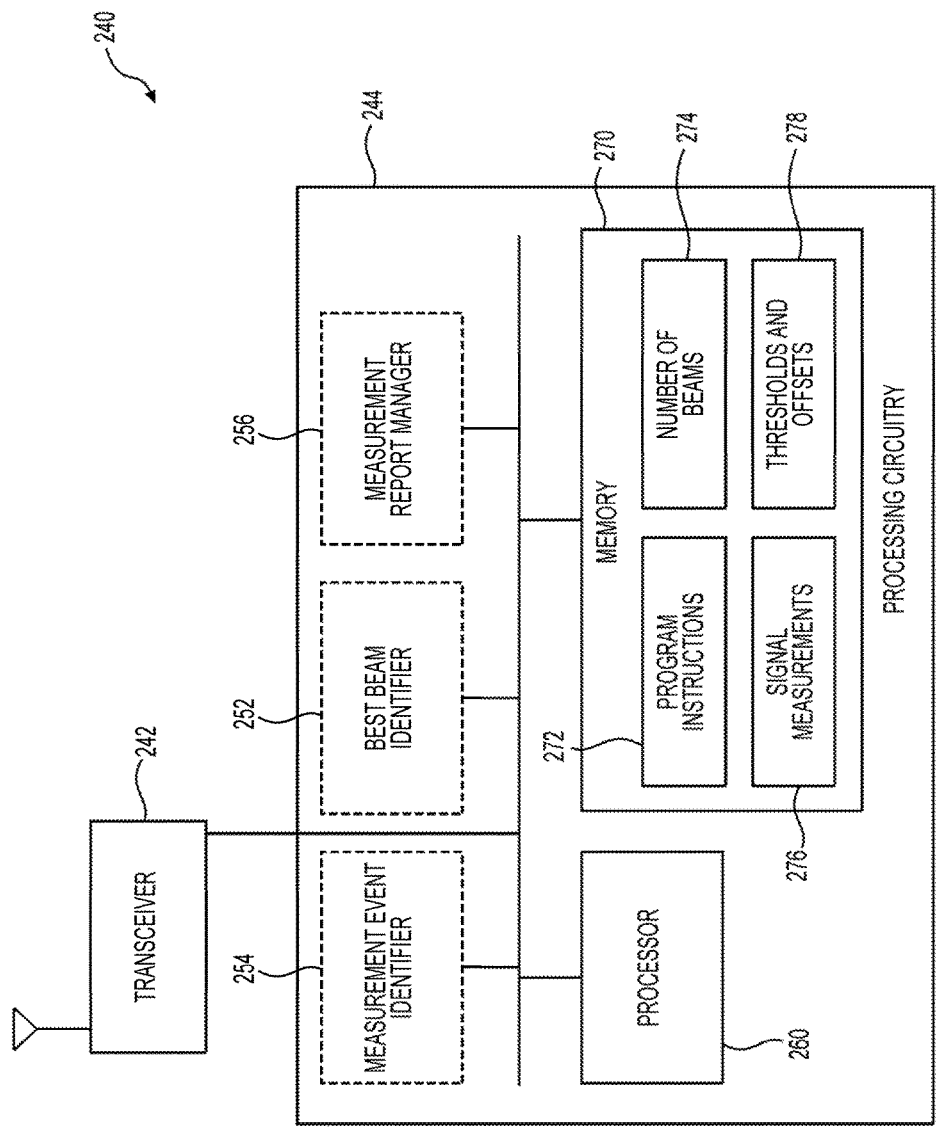
FIG. 2 shows a functional block diagram of a mobile terminal according to an embodiment of the disclosure.

FIG. 2 shows a functional block diagram of a mobile terminal 240 according to an embodiment of the disclosure. The mobile terminal 240 may correspond to the mobile terminal 140 in the communication system 100 in FIG. 1. The mobile terminal 240 can include a transceiver 242 and processing circuitry 244. The transceiver 242 is capable of wirelessly communicating with one or more base stations, such as base stations 112, 122, or 132 in FIG. 1. The transceiver 242 may communicate with a base station according to one or more predetermined communication standards, such as a Universal Mobile Telecommunications System (UMTS) standard, a Long-Term Evolution (LTE) standard, a Worldwide Interoperability for Microwave Access (WiMAX) standard, any other suitable wireless communication standard, or the like.

The processing circuitry 244 may include a best beam identifier 252, a measurement event identifier 254, a measurement report manager 256, a processor 260, and a memory 270. The memory 270 may store information including program instructions 272, a predetermined number corresponding to an upper threshold number of beams 274 to be considered, signal measurements of the received beams 276, and other data 278 such as thresholds for determining whether a signal beam is qualified for further consideration and/or offsets for defining a measurement event.

The transceiver 242 can receive a measurement configuration message 118 from a serving base station 112. The measurement configuration message 118 may indicate a predetermined number such that a measurement event can be defined based on at most the predetermined number of signal beams from a serving base station (e.g., base station 112) and at most the predetermined number of signal beams from a neighboring base station (e.g., base station 122). The predetermined number may be stored in the memory 270 as the predetermined number of beams 274.

The transceiver 242 can also measure signals from various signal beams from the serving base station and/or one or more neighboring base stations. The measurement results of the signal beams may be stored in the memory 270 as the signal measurements 276.

The best beam identifier 252 can receive the measurement results of the received signal beams from the transceiver 242 or retrieve the measurement results from the memory 270, and identifies best signal beams from a respective base station. In some examples, a number of best signal beams for each base station is set to be equal to or less than the predetermined number provided in the measurement configuration message. When determining the best signal beams, the best beam identifier 252 may only consider the signal beams that have signal measurement greater than a predetermined threshold 278 stored in the memory 270.

Optionally, the mobile terminal 240 may use a different upper threshold number in lieu of the predetermined number provided in the measurement configuration message. In some examples, if the number of signal beams from the serving base station or the neighboring base station that have signal measurement greater than the predetermined threshold is less than the predetermined number, the best beam identifier 252 may update the predetermined number using a new upper threshold number of beams. In at least one example, the upper threshold number may be set to be equal to or less than a smallest one of the predetermined number, the number of signal beams from the serving base station having signal measurements greater than the predetermine threshold, and the number of signal beams from the neighboring base station having signal measurements greater than the predetermine threshold.

The measurement event identifier 254 can determine whether a measurement event occurs based on the best signal beams identified by the best beam identifier 252. For example, the best beam identifier 252 can identify a first number of best signal beams from the serving base station and a second number of best signal beams from the neighboring base station. The measurement event identifier 254 can determine whether the measurement event occurs as defined based on at most the predetermined number of best signal beams from a serving base station and/or at most the predetermined number of best signal beams from a neighboring base station as discussed with reference to FIG. 1.

In some examples, the measurement event identifier 254 can determine that a measurement event occurs when an average signal measurement of the second best signal beams form the neighboring base station is greater than an average signal measurement of the first best signal beams form the serving base station by a predetermined offset 278 recorded in the memory 270. In one example, the measurement event identifier 254 can determine that a measurement event occurs when a largest signal measurement of the second best signal beams form the neighboring base station is greater than a largest signal measurement of the first best signal beams form the serving base station by a predetermined offset 278 recorded in the memory 270. In another example, the measurement event identifier 254 can determine that a measurement event occurs when all signal measurements of the identified second number of best signal beams of the neighboring base station are greater than the respective signal measurements of the identified first number of best signal beams of the serving base station by respective predetermined offsets 278 recorded in the memory 270.

In yet another example, the measurement event identifier 254 can determine that a measurement event occurs when all signal measurements of the identified first number of best signal beams of the serving base station are less than respective predetermined first thresholds and all signal measurements of the identified second number of best signal beams of the neighboring base station are greater than respective predetermined second thresholds. In yet another example, the measurement event identifier 254 can determine that a measurement event occurs when an average signal measurement of the identified first number of best signal beams of the serving base station is less than a predetermined third threshold and an average signal measurement of the identified second number of best signal beams of the neighboring base station is greater than a predetermined fourth threshold.

Of course, the measurement event identifier 254 can determine occurrence of the measurement event based solely on the identified first timber of best signal beams of the serving base station or based solely on the identified second number of best signal beams of the serving base station in a manner described above with reference to FIG. 1.

The measurement report manager 256 can prepare and transmit a measurement report to the serving base station via the transceiver 242 in response to the occurrence of a measurement event determined by the measurement event identifier 254. The measurement report manager 256 may compile the measurement report based on the signal measurements 276 stored in the memory 270. In some examples, the measurement report may include the signal measurements of the identified best signal beams from the serving base station and the neighboring base station. In some examples, the measurement report may include the signal measurements of the identified best signal beams from the serving base station and the neighboring base station, as well as signal measurements of other signal beams not among the identified best signal beams. In at least one example, the measurement report may include the signal measurements that are greater than a predetermined threshold 278 recorded in the memory 270.

In an alternative example, instead of sending a measurement report to the serving base station, the processing circuitry may initiate a cell reselection operation when the measurement event occurs.

The processor 260 can be configured to execute the program instructions 272 stored in the memory 270 to perform various functions. The processor 260 can include a single or multiple processing cores. Various components of the processing circuitry 244, such as the best beam identifier 252, the measurement event identifier 254, and/or the measurement report manager 256, may be implemented by hardware components, the processor 260 executing the program instructions 272, or a combination thereof. Of course, the processor 260 can also execute program instructions 272 to perform other functions for the mobile terminal 240 that are not described in the present disclosure.

The memory 270 can be used to store the program instructions 272 and information such the predetermined number for defining a measurement event 274, the signal measurements of the received signal beams 276, the thresholds for determining qualified signal beams and/or the offsets for defining the measurement event 278, and/or intermediate data. In some examples, the memory 270 includes a non-transitory computer readable medium, such as a semiconductor or solid-state memory, a random access memory (RAM), a read-only memory (ROM), a hard disk, an optical disk, or other suitable storage medium. In some embodiments, the memory 270 includes a combination of two or more of the non-transitory computer readable mediums listed above.

Figure 3:
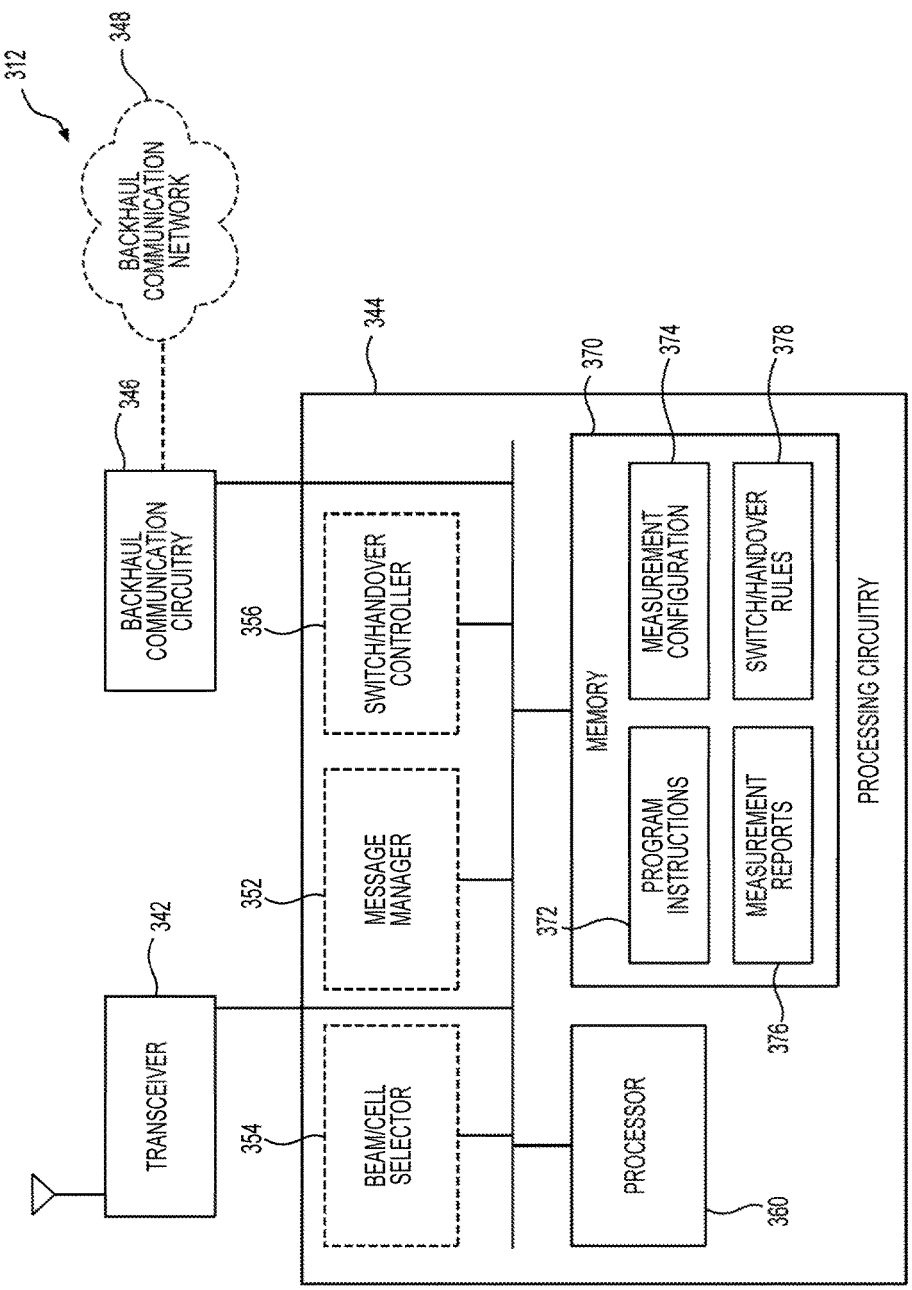
FIG. 3 shows a functional block diagram of a base station according to an embodiment of the disclosure.

FIG. 3 shows a functional block diagram of a base station 312 according to an embodiment of the disclosure. The base station 312 may correspond to the base station 112, 122, or 132 in the communication system 100 in FIG. 1. The base station 312 can include a transceiver 342, a processing circuitry 344, and a backhaul communication circuitry 346. The transceiver 342 is capable of wirelessly communicating with one or more mobile terminals, such as mobile terminal 140 in FIG. 1. The transceiver 342 may communicate with a mobile terminal according to one or more predetermined communication standards, such as the UMTS standard, the LTE standard, the WiMAX standard, any other suitable wireless communication standard, or the like. Moreover, the backhaul communication circuitry 346 is coupled with a backhaul communication network 348, through which the base station 312 may communicate with one or more servers of the communication system and/or other base stations.

The processing circuitry 344 may include a message manager 352, a beam/cell selector 354, a switch/handover controller 356, a processor 360, and a memory 370. The memory 370 may store information including program instructions 372, measurement configuration settings 374, measurement reports 376, and switch/handover rules 378.

The message manager 352 can prepare a measurement configuration message that includes various measurement configuration settings based on the measurement configuration settings 374 stored in the memory 370. The measurement configuration settings may include at least a predetermined number such that a mobile terminal can determine occurrence of a measurement event based on at most the predetermined number of signal beams from a serving base station and at most the predetermined number of signal beams from a neighboring base station. The message manager 352 can send the prepared measurement configuration message to one or more the mobile terminals through the transceiver 342.

The transceiver 342 can send the measurement configuration message prepared by the message manager 352 to one or more mobile terminals. The transceiver 343 can also receive the measurement reports from one or more mobile terminals. The received measurement reports may be stored in the memory 370.

The beam/cell selector 354, upon receipt of a measurement report from a respective mobile terminal, can determine whether the mobile terminal is to stay with a current signal beam, switch to a different beam in the same base station 312, or perform a handover to another base station. Such determination may be made based on a set of predetermined switch/handover rules 378 stored in the memory 370. In some examples, the beam/cell selector 354 determines whether to switch to a different beam from the same bases station or to a different beam from a neighboring base station based on the signal measurements provided in the measurement report, as well as the traffic loads of the base stations in the communication system, a position of the mobile terminal, a trajectory of the mobile terminal, and/or other suitable factors.

The switch/handover controller 356 may prepare the base station 312 or a neighboring base station based on whether the mobile terminal is to be switch to a different signal beam from the same base station or to a different signal beam from the neighboring base station. In some examples, switch/handover controller 356 may communicate with the neighboring base station through the backhaul communication circuitry 346 and the backhaul communication network 348 to prepare the neighboring base station for performing the handover.

The processor 360 can be configured to execute the program instructions 372 stored in the memory 370 to perform various functions. The processor 260 can include a single or multiple processing cores. Various components of the processing circuitry 344, such as the message manager 352, the beam/cell selector 354, and/or the switch/handover controller 356, may be implemented by hardware components, the processor 360 executing the program instructions 372, or a combination thereof. Of course, the processor 360 can also execute program instructions 372 to perform other functions for the base station 312 that are not described in the present disclosure.

The memory 370 can be used to store the program instructions 372 and information such the measurement configuration settings 374, the measurement reports 376, the switch/handover rules 378, and/or intermediate data. In some examples, the memory 370 includes a non-transitory computer readable medium, such as a semiconductor or solid-state memory, a random access memory (RAM), a read-only memory (ROM), a hard disk, an optical disk, or other suitable storage medium. In some embodiments, the memory 370 includes a combination of two or more of the non-transitory computer readable mediums listed above.

Figure 4:
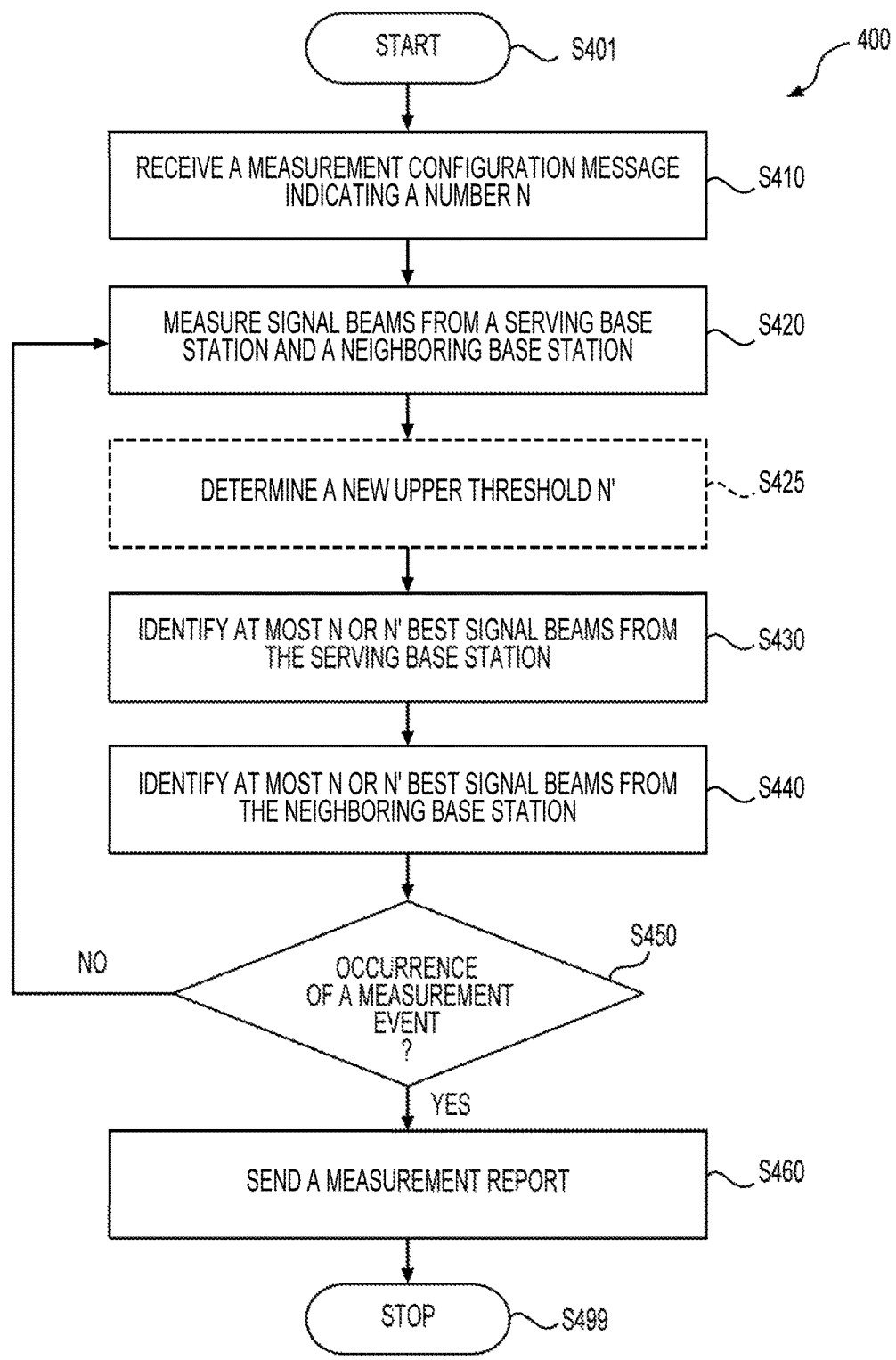
FIG. 4 shows an exemplary flow chart outlining a process for determining whether to send a measurement report according to an embodiment of the disclosure.

FIG. 4 shows an exemplary flow chart outlining a process 400 for determining whether to send a measurement report according to an embodiment of the disclosure. The process 400 may be performed by a mobile terminal in a communication network, such as the mobile terminal 140 in the communication network 100 in FIG. 1. It is understood that additional operations may be performed before, during, and/or after the process 400 depicted in FIG. 4. The process 400 starts at S401 and proceeds to S410.

At S410, a measurement configuration message was received. The measurement configuration message, in the case a predetermined number N, where a measurement event can be defined based on at most the predetermined number of signal beams from the serving base station and at most the predetermined number of signal beams from the neighboring base station. For example, the mobile terminal 140, or the transceiver 242 and the processing circuitry 244 of the mobile terminal 240, can receive a measurement configuration message 118 from the base station 112 in a manner described with reference to FIGS. 1-3.

At S420, signal beams from the serving base station and the neighboring base stations are measured. The signal beams may be measured according to their signal strength, signal-to-noise ratio, bit error rate, or the like. For example, the mobile terminal 140, or the transceiver 242 and the processing circuitry 244 of the mobile terminal 240, can measure the signal beams form the serving base station 112 and the neighboring base stations 122 and 132 in a manner described with reference to FIGS. 1-3.

At S425, a new upper threshold number. N' can be determined to be used in lieu of the predetermined number N provided by the measurement configuration message. In some examples, the new upper threshold number N' may be set to be equal to or less than a smallest one of the predetermined number, the number of signal beams from the serving base station having signal measurements greater than a predetermine qualification threshold, and the number of signal beams from the neighboring base station having signal measurements greater than the predetermine qualification threshold. For example, the best beam identifier 252 can determine whether to use such a new upper threshold number N' and/or determine the new upper threshold number N' in a manner described with reference to FIGS. 1 and 2. In some examples, S425 may be omitted, and the process may proceed from S420 directly to S430.

At S430, at most N (or N' if applicable) best signal beams from the serving base station can be identified. In some examples, each of the identified signal beams from the serving based station has a signal measurement greater than the predetermined qualification threshold. For example, the best beam identifier 252 can identify a first number of best beams from the serving base station 112 in a manner as described with reference to FIGS. 1 and 2.

At S440, at most N (or N' if applicable) best signal beams from a neighboring base station can be identified. In some examples, each of the identified signal beams from the neighboring based station has a signal measurement greater than the predetermined qualification threshold. For example, the best beam identifier 252 can identify a second number of best beams from the neighboring base station 122 in a manner described with reference to FIGS. 1 and 2.

At S450, occurrence of a measurement event is determined based on the first number of best beams from the serving base station identified at S430 and the second number of best beams from the neighboring base station identified at S440. If it is determined that the measurement event occurs, the process proceeds to S460. If it is determined that the measurement event does not occur, the process proceeds to S420, where updated measurements of signal beams are obtained. For example, the measurement event identifier 254 can determine whether the measurement event occurs based on the identified best signal beams from the serving base station 112 and the identified best signal beams from the neighboring base station 122 in a manner described with reference to FIGS. 1 and 2.

At S460, a measurement report is sent to the serving base station when it is determined that the measurement event occurs. In some examples, the measurement report may include the signal measurements of the identified best signal beams from the serving base station and the neighboring base station, or optionally signal measurements of other signal beams not within the identified best signal beams. In at least one example, the measurement report may include the signal measurements that are greater than the predetermined qualification threshold used in S430 and S440 even the corresponding signal beams are not within the identified predetermined number N (or N') best signal beams. For example, the measurement report manager 256 can prepare the measurement report and send the measurement report to the serving base station 112 when the measurement event identifier 254 determines that the measurement event occurs in a manner described with reference to FIGS. 1 and 2.

In at least one alternative example, instead of sending a measurement report to the serving base station, S460 may include initiating a cell reselection operation when the measurement event occurs.

Finally, the process proceeds to S499 and terminates.

Figure 5:
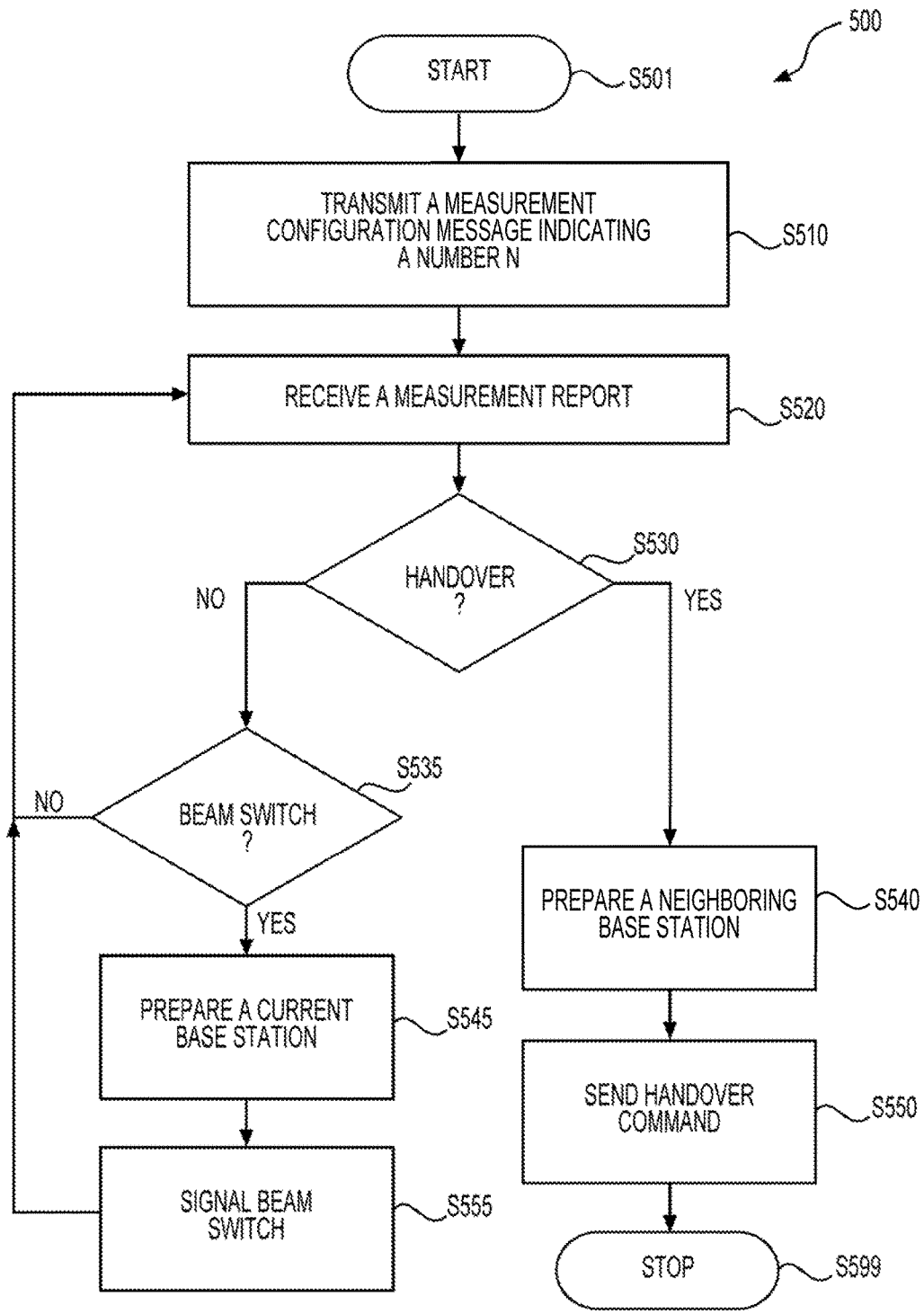
FIG. 5 shows an exemplary flow chart outlining a process for determining whether to send a handover command or to signal an intra-cell beam switching according to an embodiment of the disclosure.

FIG. 5 shows an exemplary flow chart outlining a process 500 for determining whether to send a handover command or to signal an intra-cell beam switching according to an embodiment of the disclosure. The process 500 may be performed by a base station in a communication network, such as the base station 112 in the communication network 100 in FIG. 1. It is understood that additional operations may be performed before, during, and/or after the process 500 depicted in FIG. 5. The process 500 starts at S501 and proceeds to S510.

At S510, a measurement configuration message is transmitted to a mobile terminal. The measurement configuration message may include information indicating a predetermined number N, where a measurement event being defined based on at most the predetermined number of signal beams from a serving base station and at most the predetermined number of signal beams from a neighboring base station. For example, the base station 112, or the transceiver 342 and the message manager 352 of the base station 312, can transmit the measurement configuration message to a mobile terminal 140 in a manner described with reference to FIGS. 1 and 3.

At S520, a measurement report is received from a mobile terminal where the measurement event defined based on the predetermined number N has occurred. For example, the base station 112, or the transceiver 342 and the message manager 352 of the base station 312, can receive the measurement report from the mobile terminal 140 in a manner described with reference to FIGS. 1 and 3.

At S530, after receiving the measurement report at S520, it is determined whether a handover should be performed in order to switch the mobile terminal from using a signal beam from a serving bases station to a different signal beam from a neighboring base station. If it is determined that the handover needs not to be performed, the process proceeds to S535. If it is determined that handover should be performed, the process proceeds to S540. For example, the base station 112, or the switch/handover controller 356, can determine whether to perform the handover in a manner described with reference to FIGS. 1 and 3.

At S535, it is further determined whether to perform an intra-cell beam-switching operation to switch the mobile terminal from using a signal beam from the serving bases station to a different signal beam from the serving base station. If it is determined that the intra-cell beam-switching operation needs not to be performed, the process proceeds to S520 to wait for a next measurement report if it is determined that the intra-cell beam-switching operation is to be performed, the process proceeds to S545. For example, the base station 112, or the switch/handover controller 356 can determined whether to perform the intra-cell beam-switching operation in a manner described with reference to FIGS. 1 and 3.

At S540, when it is determined that the handover is to be performed, a corresponding neighboring base station is prepared to serve the mobile terminal. At S550, a handover command is sent to the mobile terminal for executing the handover. Afterwards, the process proceeds to S599 and terminates. For example, the base station 112, or the switch/handover controller 356, can prepare the neighboring base station 122 through backhaul communication circuitry 346 and a backhaul communication network 348, and send a handover command, to the mobile terminal 140 through the transceiver 342 in a manner described with reference to FIGS. 1 and 3.

At S545, when it is determined that the intra-cell beam-switching operation is to be performed, the serving base station prepares itself to serve the mobile terminal using a different signal beam. At S555, a beam switching notification is signaled to the mobile terminal for executing the beam-switching operation. Afterwards, the process proceeds to S520 to wait for a next measurement report. For example, the base station 112, or the switch/handover controller 356, can prepare the serving base station 112 and signal a beam switching notification to the mobile terminal 140 in a manner described with reference to FIGS. 1 and 3.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
  receiving, by a mobile terminal, a measurement configuration message indicating a predetermined number, a measurement event being defined based on the predetermined number of signal beams from a serving base station and the predetermined number of signal beams from a neighboring base station;
  measuring signal beams from the serving base station and the neighboring base station;
  identifying, among the measured signal beams, a first number of best signal beams from the serving base station, the first number being equal to or less than the predetermined number;
  identifying, among the measured signal beams, a second number of best signal beams from the neighboring base station, the second number being equal to or less than the predetermined number;
  determining whether the measurement event occurs based on the first number of best signal beams from the serving base station and the second number of best signal beams from the neighboring base station; and
  sending a measurement report to the serving base station in response to a determination that the measurement event occurs.

2. The method according to claim 1, wherein
  the identifying the first number of best signal beams from the serving base station is performed in a manner that each of the identified first number of best signal beams from the serving base station has a signal measurement greater than a predetermined threshold; and
  the identifying the second number of best signal beams from the neighboring base station is performed in a manner that each of the identified second number of best signal beams from the neighboring base station has a signal measurement greater than the predetermined threshold.

3. The method according to claim 1, wherein the determining whether the measurement event occurs comprises:
  determining a first average signal measurement of the identified first number of best signal beams from the serving base station;
  determining a second average signal measurement of the identified second number of best signal beams from the neighboring base station; and
  determining that the measurement event occurs when the second average signal measurement is greater than the first average signal measurement by a predetermined offset.

4. The method according to claim 3, wherein
  the predetermined offset is set to a first value when the first number is not greater than the second number, and
  the predetermined offset is set to a second value greater than the first value when the first number is greater than the second number.

5. The method according to claim 1, wherein the determining whether the measurement event occurs comprises:
  determining a first largest signal measurement of the identified first number of best signal beams from the serving base station;
  determining a second largest signal measurement of the identified second number of best signal beams from the neighboring base station; and
  determining that the measurement event occurs when the second largest signal measurement is greater than the first largest signal measurement by a predetermined offset.

6. The method according to claim 1, wherein the determining whether the measurement event occurs comprises:
  for each of the identified second number of best signal beams, comparing a signal measurement thereof against that of a comparably-ranked one of the identified first number of best signal beams from the serving base station;

determining that the measurement event occurs when all the signal measurements of the identified second number of best signal beams from the neighboring base station are greater than the respective signal measurements of the identified first number of best signal beams from the serving base station by respective predetermined offsets.

7. The method according to claim 1, further comprising:

identifying, among the measured signal beams, a third number of signal beams from the serving base station that have signal measurements greater than a predetermined threshold;

identifying, among the measured signal beams, a fourth number of signal beams from the neighboring base station that have signal measurements greater than the predetermined threshold; and setting the first number and the second number to be equal to or less than a upper threshold number, which is a smallest one of the predetermined number, the third number, and the fourth number.

8. The method according to claim 1, wherein the determining whether the measurement event occurs comprises:

determining that the measurement event occurs when all signal measurements of the identified first number of best signal beams from the serving base station are less than respective predetermined thresholds; or determining that the measurement event occurs when an average signal measurement of the identified first number of best signal beams from the serving base station is less than a predetermined threshold.

9. The method according to claim 1, wherein the determining whether the measurement event occurs comprises:

determining that the measurement event occurs when all signal measurements of the identified second number of best signal beams from the neighboring base station are greater than respective predetermined thresholds; or determining that the measurement event occurs when an average signal measurement of the identified second number of best signal beams from the neighboring base station is greater than a predetermined threshold.

10. The method according to claim 1, wherein the determining whether the measurement event occurs comprises:

determining that the measurement event occurs when all signal measurements of the identified first number of best signal beams from the serving base station are less than first respective predetermined thresholds and all signal measurements of the identified second number of best signal beams from the neighboring base station are greater than second respective predetermined thresholds; or determining that the measurement event occurs when an average signal measurement of the identified first number of best signal beams from the serving base station is less than a third predetermined threshold and an average signal measurement of the identified second number of best signal beams from the neighboring base station is greater than a fourth predetermined threshold.

11. A mobile terminal, comprising:

a transceiver configured to:

receive a measurement configuration message indicating a predetermined number, a measurement event being defined based on the predetermined number of signal beams from a serving base station and the predetermined number of signal beams from a neighboring base station;

measure signal beams from the serving base station and the neighboring base station; and send a measurement report to the serving base station in response to a determination that the measurement event occurs; and processing circuitry configured to:

identify, among the measured signal beams, a first number of best signal beams from the serving base station, the first number being equal to or less than the predetermined number;

identify, among the measured signal beams, a second number of best signal beams from the neighboring base station, the second number being equal to or less than the predetermined number; and determine whether the measurement event occurs based on the first number of best signal beams from the serving base station and the second number of best signal beams from the neighboring base station.

12. The mobile terminal according to claim 11, wherein the processing circuitry is configured to:

identify the first number of best signal beams from the serving base station in a manner that each of the identified first number of best signal beams from the serving base station has a signal measurement greater than a predetermined threshold; and identify the second number of best signal beams from the neighboring base station in a manner that each of the identified second number of best signal beams from the neighboring base station has a signal measurement greater than the predetermined threshold.

13. The mobile terminal according to claim 11, wherein the processing circuitry is configured to:

determine a first average signal measurement of the identified first number of best signal beams from the serving base station;

determine a second average signal measurement of the identified second number of best signal beams from the neighboring base station; and determine that the measurement event occurs when the second average signal measurement is greater than the first average signal measurement by a predetermined offset.

14. The mobile terminal according to claim 13, wherein the predetermined offset is set to a first value when the first number is not greater than the second number, and the predetermined offset is set to a second value greater than the first value when the first number is greater than the second number.

15. The mobile terminal according to claim 11, wherein the processing circuitry is configured to:

identify, among the measured signal beams, a third number of signal beams from the serving base station that have signal measurements greater than a predetermined threshold;

identify, among the measured signal beams, a fourth number of signal beams from the neighboring base station that have signal measurements greater than the predetermined threshold; and set the first number and the second number to be equal to or less than a upper threshold number, which is a smallest one of the predetermined number, the third number, and the fourth number.

* * * * *

UNITED STATES PATENT AND TRADEMARK OFFICE
CERTIFICATE OF CORRECTION

PATENT NO. : 10,219,191 B2
APPLICATION NO. : 15/656366
DATED : February 26, 2019
INVENTOR(S) : Li-Chuan Tseng et al.

Page 1 of 1

It is certified that error appears in the above-identified patent and that said Letters Patent is hereby corrected as shown below:

On the Title Page

Item (72) Inventors: delete "Li-Chuang Tseng" and insert -- Li-Chuan Tseng --.

Signed and Sealed this
Sixth Day of October, 2020

Andrei Iancu
*Director of the United States Patent and Trademark Office*